United States Patent
Miron et al.

(10) Patent No.: US 12,293,572 B2
(45) Date of Patent: May 6, 2025

(54) METHOD AND DEVICE FOR GENERATING TRAINING DATA TO GENERATE SYNTHETIC REAL-WORLD-LIKE RAW DEPTH MAPS FOR THE TRAINING OF DOMAIN-SPECIFIC MODELS FOR LOGISTICS AND MANUFACTURING TASKS

(71) Applicant: Robert Bosch GmbH, Stuttgart (DE)

(72) Inventors: Yakov Miron, Haifa (IL); Yoel Shapiro, Kiryat Bialik (IL)

(73) Assignee: ROBERT BOSCH GMBH, Stuttgart (DE)

( * ) Notice: Subject to any disclaimer, the term of this patent is extended or adjusted under 35 U.S.C. 154(b) by 378 days.

(21) Appl. No.: 17/883,935

(22) Filed: Aug. 9, 2022

(65) Prior Publication Data

US 2023/0055538 A1    Feb. 23, 2023

(51) Int. Cl.
*G06V 10/774* (2022.01)
*G06V 10/82* (2022.01)

(52) U.S. Cl.
CPC ............ *G06V 10/774* (2022.01); *G06V 10/82* (2022.01)

(58) Field of Classification Search
CPC ......... G06V 10/774; G06V 10/82; G06T 1/20
USPC ....................................................... 382/157
See application file for complete search history.

(56) References Cited

U.S. PATENT DOCUMENTS

2024/0310515 A1* 9/2024 Kottege .................. G01S 13/89

FOREIGN PATENT DOCUMENTS

EP    3300025 A1 *  3/2018   ......... G06K 9/00201

OTHER PUBLICATIONS

Tsuji et al., "Non-Guided Depth Completion With Adversarial Networks," 2018 21st International Conference on Intelligent Transportation Systems (ITSC), 2018, pp. 1109-1114.
Ma et al., "Sparse-to-Dense: Depth Prediction From Sparse Depth Samples and a Single Image," Cornell University, 2017, pp. 1-8.
Geiger et al., "Are We Ready for Autonomous Driving? The Kitti Vison Benchmark Suite," 2012 IEEE Conference on Computer Vision and Pattern Recognition, 2012, pp. 1-8.
Baruhov et al., "Unsupervised Enhancement of Real-World Depth Images Using Tri-Cycle Gan," Cornell University, 2020, pp. 1-10.
Atapour-Abarghouei et al., "Real-Time Monocular Depth Estimation Using Synthetic Data With Domain Adaptation via Image Style Transfer," 2018 IEEE/CVF Conference on Computer Vision and Pattern Recognition, 2018, pp. 2800-2810.

* cited by examiner

*Primary Examiner* — Charlotte M Baker
(74) *Attorney, Agent, or Firm* — NORTON ROSE FULBRIGHT US LLP; Gerard A. Messina

(57)    ABSTRACT

A computer-implemented method for providing training data for training of a data-driven depth completion model as a machine-learning model, wherein the depth completion model is to be trained to generate dense depth maps from sensor acquired raw depth maps. The method includes: providing multiple synthetic dense depth map data items from CAD data of various synthetic scenes; providing multiple real raw depth map data items obtained from real-world depth sensor measurements of real-world scenes; training a generative model for obtaining a trained generator model for generating generated raw depth map data items from the synthetic dense depth map data items; applying the trained generator model to generate training data from provided synthetic dense depth map data.

10 Claims, 4 Drawing Sheets

METHOD AND DEVICE FOR GENERATING TRAINING DATA TO GENERATE SYNTHETIC REAL-WORLD-LIKE RAW DEPTH MAPS FOR THE TRAINING OF DOMAIN-SPECIFIC MODELS FOR LOGISTICS AND MANUFACTURING TASKS

CROSS REFERENCE

The present application claims the benefit under 35 U.S.C. § 119 of European Patent Application No. EP 21 19 2503.7 filed on Aug. 23, 2021, which is expressly incorporated herein by reference in its entirety.

FIELD

The present invention relates to the presentation of raw depth maps of real-world environments to be used in logistics and manufacturing tasks. The depth map shall be used to train data-driven or probabilistic models, e.g., in the field of industrial robotic applications.

BACKGROUND INFORMATION

Robotic manipulation is an important component for logistic and assembly tasks. Operation in random environments requires perception most commonly implemented with a camera for image data acquisition and a computer vision model to derive 3D information therefrom for task and motion planning.

Apart from 3D modeling based on camera acquisition, depth sensors, such as Lidar, radar and ultrasonic sensors, can provide a direct measurement of the 3D geometry. By means of depth sensors, raw depth maps can be acquired for shape and location prediction of unknown objects.

Depth sensors can make use of different technical principles including stereo vision, structured light and time of flight measurements, all of which suffer from large errors and loss of information due to optical reflections, deflection and/or refraction. Such errors in raw depth maps acquired by depth sensors are prominent in industrial settings which commonly include reflective metallic objects or the like.

The shortcomings of conventional depth sensors have been previously addressed with depth completion models which are configured to generate a dense (complete) depth map using a partial sampling of the raw depth map guided by visual RGB cues such as perspective occlusions, object boundaries and surface normals. Depth completion data sets include RGB and raw depth inputs and an estimated ground truth dense depth map. Depth completion models can integrally be included in any kind object detection and object segmentation models.

SUMMARY

According to the present invention, a method for providing a training data set for training a depth completion model and a device, are provided.

Example embodiments of the present invention are disclosed herein.

According to a first aspect of the present invention, a computer-implemented method for providing training data for training of a data-driven depth completion model as a machine-learning model is provided, wherein the depth completion model is to be trained to generate dense depth maps from sensor acquired raw depth maps. According to an example embodiment of the present invention, the method includes the steps of:
  providing multiple synthetic dense depth map data items from CAD data of various synthetic scenes;
  providing multiple real raw depth map data items obtained from real-world depth sensor measurements of real-world scenes;
  training a generative model for obtaining a trained generator model for generating generated raw depth map data items from the synthetic dense depth map data items;
  applying the trained generator model to generate training data from provided synthetic dense depth map data.

Depth completion models are provided to obtain dense depth maps from sensor acquired raw depth maps. "Dense" in this context means that the depth maps does not have any area where depth information does not exist or is invalid. Depth completion models have to be trained based on dense depth maps indicating depth information for each pixel and erroneous raw depth maps indicating a depth map usually provided by a depth sensor under real-world conditions. The raw depth map usually only includes a partial sampling of the real-world environment due to optical reflections, refractions and/or deflections or the like.

Depth completion models may be implemented as data-driven models, e.g., machine learning models, which generally uses training data at least comprising raw depth map data and dense depth map data. Obtaining such training data normally requires to actually set up an industrial objects' scene (arrangement of objects in real world), perform a depth sensor measurement with a depth sensor to acquire raw depth map data and determine/compute the (complete) dense depth map data from different 3D detection approaches, e.g. made from different image (RGB) recordings with different camera poses. Obtaining such training data can be quite cumbersome, particularly when a high amount of training data sets is required.

According to an example embodiment of the present invention, it is supposed to generate raw depth maps based on synthetic dense depth maps which are provided as data sets which can be generated relatively effortless from computer simulations of designed scenes (CAD scenes). Therefore, the synthetic raw depth maps are artificially created from ideal synthetic dense depth maps.

Furthermore, the training data generated by using the trained generator model is used to train a data-driven depth completion model which completes undetermined or unplausible pixel areas in erroneous raw depth map data items. The so obtained combinations of dense depth maps and raw depth maps therefore can be successfully used to train depth completion models or various models for logistics and assembly tasks. However, as these models are usually applied in systems where depth sensors are applied, there is a mismatch between the model training which is based on synthetic dense depth maps and the raw depth maps provided by the depth sensors.

Synthetic image data items may be obtained from CAD data of the various synthetic scenes associated with the synthetic dense depth map data items; wherein the generator model is trained with a synthetic dense depth map data item depending on the corresponding synthetic image data item.

Particularly, photorealistic images including dense depth maps can be synthetically generated as synthetic RGBD data. The synthetic RGBD data include a generated image pixel map (RGB image) and depth information for each of the pixels (depth map), The generated depth information usually provide flawless dense depth maps which provide depth information for each of the pixels and which is therefore radically different from the sensor outputs of real depth sensors commonly used in industrial applications. While the industrial applications have to use real-world sensor data which represent merely raw (erroneous or imperfect) depth map data, a model training with synthetic RGBD data will result in insufficient models.

The method according to the present invention, therefore, provides generating raw depth map data for training data for depth completion models from synthetic dense (flawless) depth map data provided by synthetic models such as computer vision models using CAD input data of exemplary scenes or the like. The training may be made using a generative adversarial network (GAN network) which uses a generator model to associate a synthetic depth map as input to a generated raw depth map.

Furthermore, sensor-acquired (real) raw depth map data is provided. The generated raw depth map data and the real raw depth map data are fed to the discriminator which will be trained to distinguish between the generated raw depth map data and the real raw depth map data. Here, the generated raw depth map data and the real raw depth map data may be provided unpaired, which means that the generated and real depth map data may depict different scenes.

According to an example embodiment of the present invention, the generator model may be further supplied with RGB image data corresponding to the synthetic depth map data to facilitate the generation of the generated raw depth map data.

Furthermore, the synthetic RGB image data may be fed to the discriminator without modification in conjunction with the generated raw depth map data. Also, provision of the RGB image data after a conversion to a grayscale image may reduce the appearance gap between the generated raw depth map data and the real raw depth map data as otherwise the discriminator model may latch on to extraneous features, such as the work surface color.

The training of the GAN model is made using a min-max optimization based on a discriminator loss further considering a marginal preservation loss, which is configured to penalize the generator model during training against modifying the dense depth map input unless the modification is larger than a given marginal threshold, wherein particularly the marginal threshold is determined based on a difference between the synthetic dense depth map data item and the generated raw depth map data item.

Thus, to avoid that the generator learns to remove objects and to replace them with a hole or with depth information of the underlying surface they were located on, a marginal preservation loss may be considered which penalizes the generator model during training against modifying the dense depth map input $D_{syn}$ unless the modification is larger than a marginal threshold margin. The preservation loss $L_p$ considers that holes and artifacts in raw depth maps $D_{raw\_syn}$ are usually substantially different from the intermediate surroundings.

$$\Delta = |D_{syn} - D_{raw\_syn}|$$

$$\text{margin} = x \text{ percentile of } \Delta$$

$$L_p[i, j] = \begin{cases} \Delta[i, j] & \Delta[i, j] < \text{margin} \\ 0 & \text{otherwise} \end{cases}$$

wherein x can be selected as from $10^{th}$ to $50^{th}$ percentile, preferable between $15^{th}$-$25^{th}$ percentile, e.g. $20^{th}$ percentile.

The method of the present invention can be applied on the generation of photorealistic depth images from synthetic depth images. This method is applicable to any machine-learning technique to do domain transfer or style transfer from the synthetic regime to the real one. One preferred example for this kind of usage is the generation of the depth completion model. However, above method can be applied to train other models for different tasks, e.g., object detection.

According to a further aspect of the present invention, a device for providing training data for training of a data-driven depth completion model as a machine-learning model is provided, wherein the depth completion model is to be trained to generate dense depth maps from sensor acquired raw depth maps. According to an example embodiment of the present invention, the device is configured to:
provide multiple synthetic dense depth map data items from CAD data of various synthetic scenes;
provide multiple real raw depth map data items obtained from real-world depth sensor measurements of real-world scenes;
train a generative model for obtaining a trained generator model for generating generated raw depth map data items from the synthetic dense depth map data items;
apply the trained generator model to generate training data from provided synthetic dense depth map data.

BRIEF DESCRIPTION OF THE DRAWINGS

Example embodiments of the present invention are described in more detail in conjunction with the figures.

DETAILED DESCRIPTION OF EXAMPLE EMBODIMENTS

Figure 1:
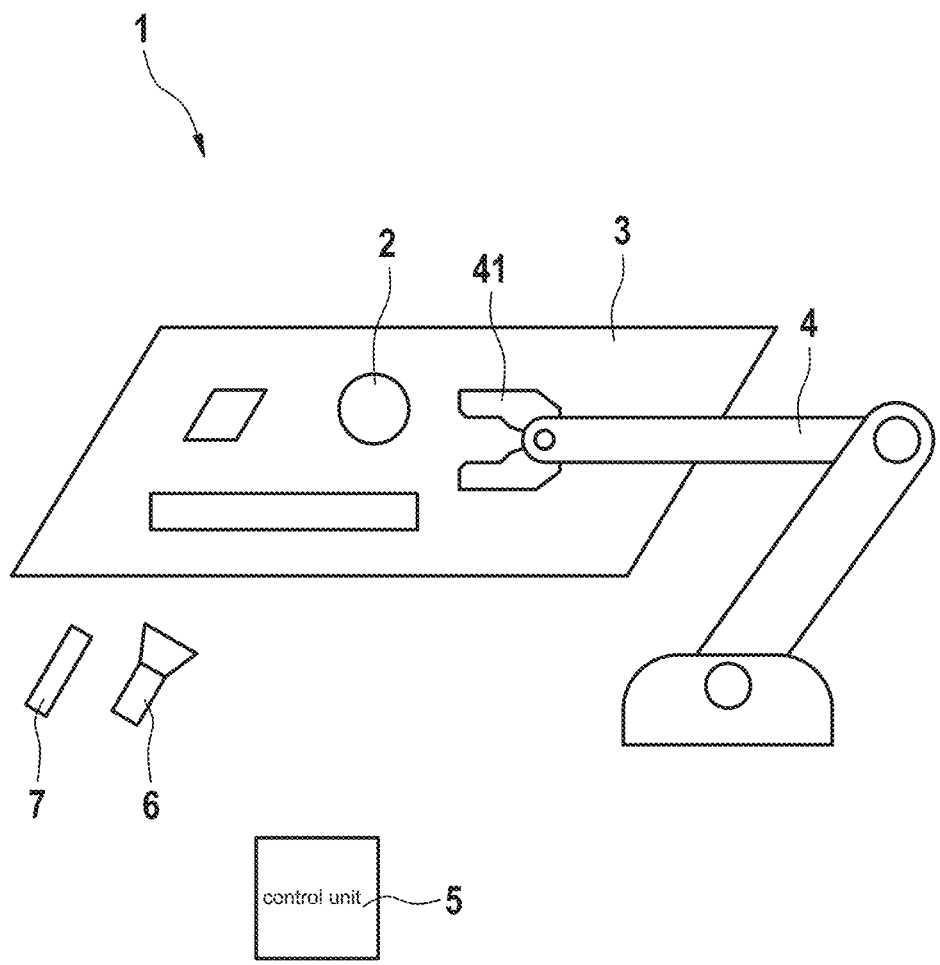
FIG. 1 schematically shows the setup of an industrial application where an RGBD camera acquires image and depth information of an environment and controls the robot arm to handle environmental objects in the environment according to the perception of the camera sensors.

FIG. 1 schematically shows an industrial scene 1 where environmental objects 2 in a workspace 3 shall be manipulated. The manipulation of the environmental objects 2 shall be made by a robot arm 4 with a gripping tool 41 which is controlled by a control unit 5.

A camera 6 and a depth sensor 7 which are typically implemented in a single RGBD device, such as a depth-camera, are provided which is configured to acquire an RGB image of the workspace 3 and raw depth information respectively. The so obtained RGBD data item includes the RGB image data item and a depth map data item (depth pixel information for the pixels of the RGB image). The acquired raw depth map may comprise errors due to artifacts in acquiring the depth pixel information. Therefore, models used in the control unit 5 to perform a manipulation task have to cope with the imperfect input information, particularly of the depth pixel information.

The model used in the control unit 5 may include a data-driven depth completion model as a machine-learning model which substantially is configured and trained to complete the sensor-acquired raw depth map data to obtain dense (complete) depth map data without any missing pixel information. To train such a depth completion model, raw depth data and dense depth data corresponding thereto have to be provided as training data. Preferably, RGB image data can further be used to improve the completion of the raw depth data acquired by the depth sensor 7.

While numerous synthetic RGBD data items may be generated cheaply from CAD models or the like depending on different camera poses and sensor poses (Point-of-View), raw depth data usually can only be acquired by real-world measurements using a depth sensor. As necessary for the training of a data-driven model (machine learning model), those raw depth data should be acquired for different real-world object settings, the acquisition of a reasonable amount of raw depth map data items for different workspace scenes is quite costly and a time-consuming process.

Figure 2:
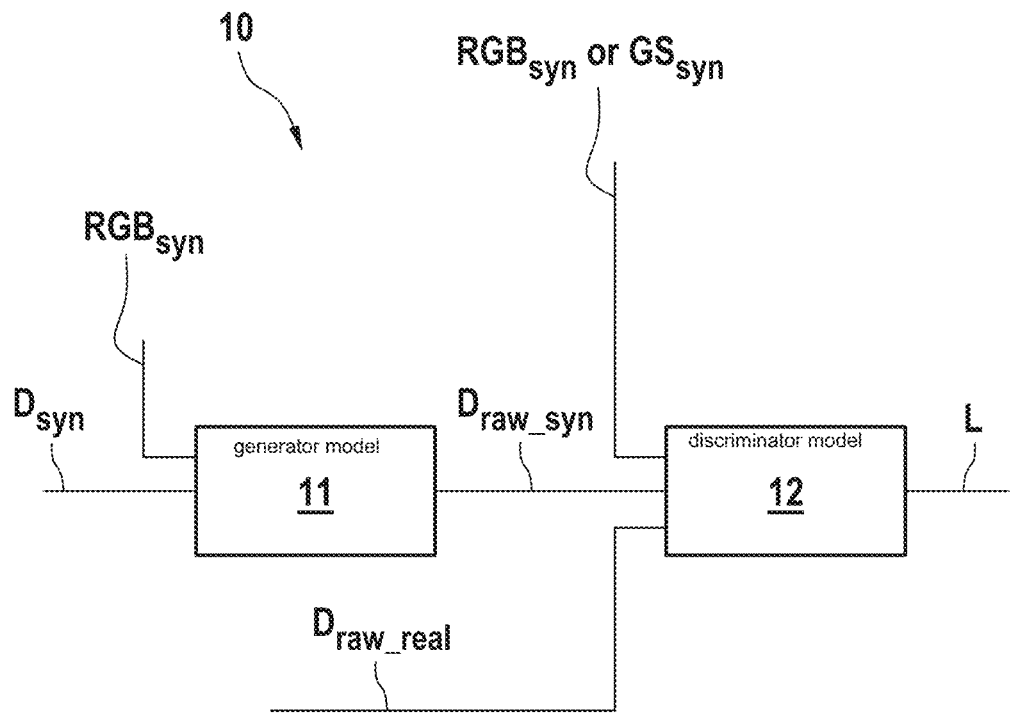
FIG. 2 shows a block diagram of a GAN model the generation of a raw depth map data generator model.

Therefore, a method to obtain raw depth data artificially generated by using synthetic depth data as input. This is made by using a GAN model 10 which is computer-implemented and exemplarily depicted in the block diagram of FIG. 2.

The GAN model 10 has a generator model 11 which is configured/trained to convert synthetic depth map data items $D_{syn}$ as input data to generated raw depth map data items. The GAN model 10 has a discriminator 12 which is trained to distinguish between the generated raw depth map data items and real/sensor-acquired raw depth map data items which have been acquired by a depth sensor as used in the present application. The scenes for obtaining the real raw depth map data items do not necessarily correspond to the scenes for obtaining the synthetic dense depth map data items.

The generator model 11 and the discriminator model 12 may both be implemented as an artificial neural network, e.g. by means of a convolutional neural network (CNN) which is appropriate for processing map data.

The GAN model 10 is trained by one of the conventional methods according to a min max optimization problem as given by the equation $$\min_G \max_D V(D, G) = \mathbb{E}_{x \sim p_{data}(x)}[\log D(x)] + \mathbb{E}_{z \sim p_z(z)}[\log(1 - D(G(z)))]$$

wherein G is a transfer function of the generator model 11, wherein D is a transfer function of the discriminator model 12, D(x) the probability that x is taken from real training data rather than generated by the generator model 11, V(D, G) the loss function for the min/max optimization which depends on the output of the discriminator model 12 and $p_G$ the generator's probability distribution over the real training data x and $p_z$ the probability distribution of the input noise variable.

The GAN model 10 can be alternatingly trained by training the discriminator model 12 to improve distinguishing between real raw depth map data items $D_{raw\_real}$ and generated raw depth map data items $D_{raw\_syn}$. Real raw depth map data items $D_{raw\_real}$ are usually erroneous and have missing or invalid depth information for one or more pixels. The output loss L of the discriminator 12 is the higher the better it can be distinguished between the real raw depth map data items $D_{raw\_real}$ and the generated raw depth map data items $D_{raw\_syn}$.

The loss L however shall be minimized for training the generator model 11.

To improve the learning of the GAN model 10, the synthetic RGB image data item $RGB_{syn}$ corresponding to the scene related to the respective synthetic depth data item $D_{syn}$ can be additionally used as input of the generator model 11. This facilitates the training of the generator model 11.

Moreover, the synthetic RGB image data item can also be used as input of the discriminator model 12. Particularly, the RGB image data can be transformed to grayscale image data item $GS_{syn}$ and optionally used as an input for the discriminator model 12 with the corresponding generated raw depth data item $D_{raw\_syn}$. Considering the additional image data item may improve geometric consistency, while the additional conversion to a grayscale image may further reduce the appearance gap between the synthetic raw depth map data items $D_{raw\_syn}$ and real raw depth map data items $D_{raw\_real}$. Otherwise, the discriminator model 12 might latch onto extraneous features. This may be applied only when the synthetic depth map and image data items correspond to the same scene taken from different camera poses.

To avoid the occurrence of vanishing objects in the generated raw depth map data item $D_{raw\_syn}$, the loss L might be modified by adding a marginal preservation loss $L_p$ which may be determined by:

$$\Delta = |D_{syn} - D_{raw\_syn}|$$

$$\text{margin} = 20th \text{ percentile of } \Delta$$

$$L_p[i, j] = \begin{cases} \Delta[i, j] & \Delta[i, j] < \text{margin} \\ 0 & \text{otherwise} \end{cases}$$

wherein $D_{syn}$ corresponds to the synthetic dense depth map data item and $D_{raw\_syn}$ to the generated raw depth map data item. The additional loss term $L_p$ provides a penalty for the training of the generator model 11 for modifying the input dense depth map data item, unless the obtained modification is larger than the margin threshold margin which is given. By the preservation loss $L_p$, holes and artifacts in raw depth map data are usually substantially different from their immediate surroundings. The undesired object removal modifies the synthetic depth map by the object height.

Figure 3:
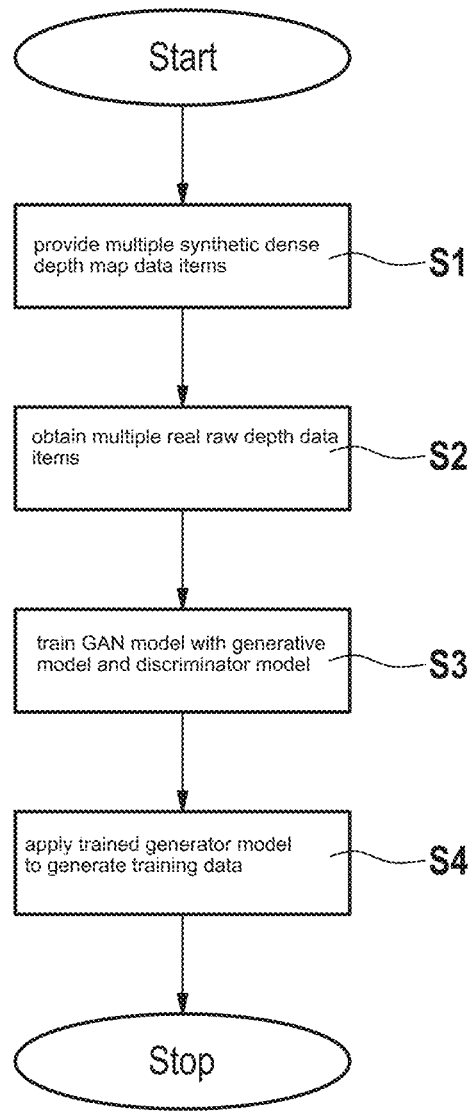
FIG. 3 shows a flow chart for illustrating the method steps for providing training data for training machine learning models to be applied in robotic applications.
Figures 4A, 4B, 4C, 4D:
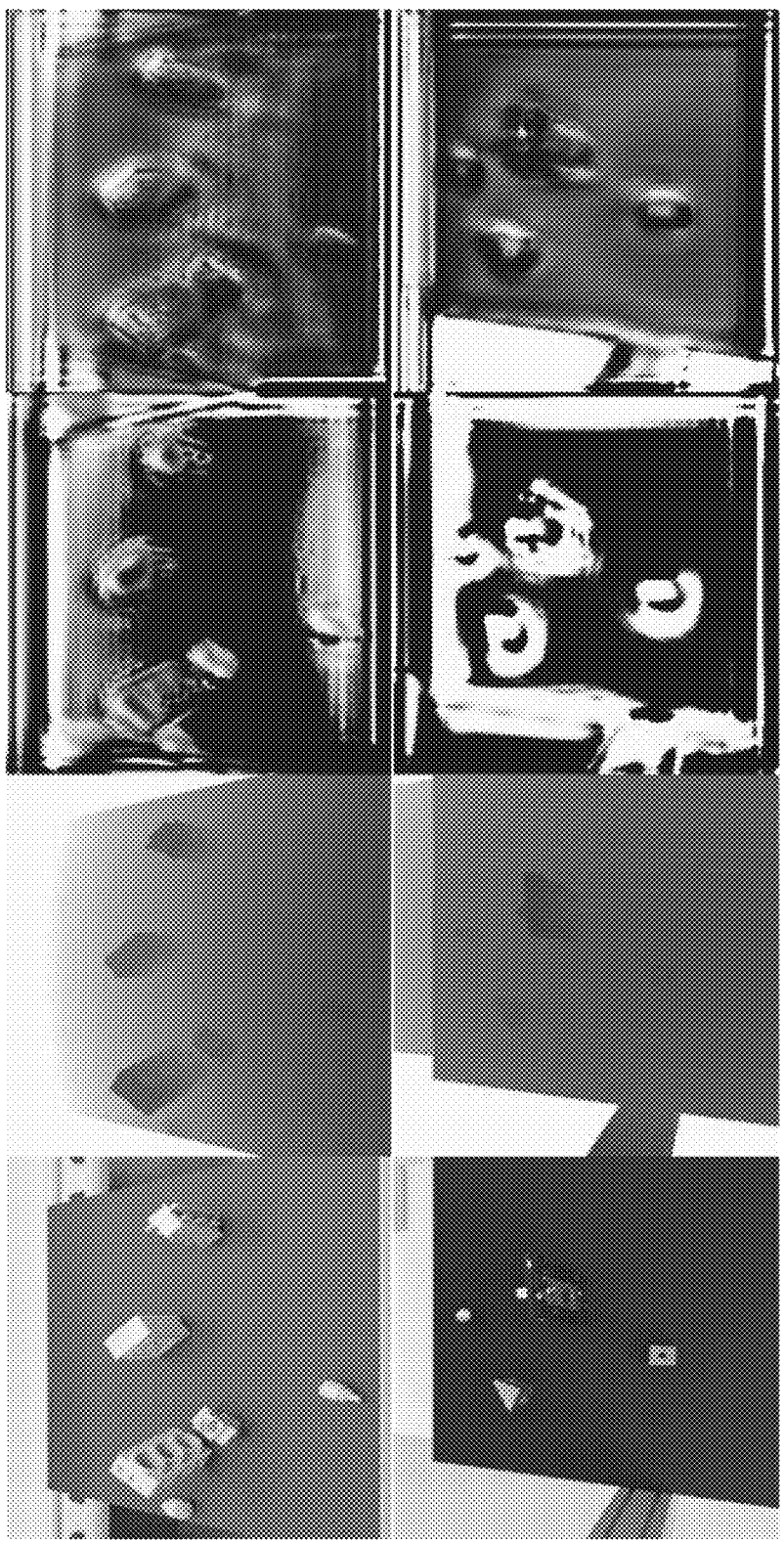
FIGS. 4A-4D show two exemplary sets of images showing a synthetic RGB image of an exemplary scene, a synthetic depth map of this scene, a generated raw depth map modeled with the generator model without preservation loss, and a generated raw depth map with consideration of preservation loss.

As an example, FIG. 3 shows a flow chart illustrating the method of generating training data for training of a data-driven depth completion model as a machine-learning model.

In step S1 multiple synthetic dense depth map data items are provided, e.g. from CAD data of various synthetic scenes.

In step S2 multiple real raw depth map data items obtained from real-world depth sensor measurements of real-world scenes are provided.

As described above, in step S3 the GAN model 10 as a generative model is trained with a generator model 11 and a discriminator model 12 so as to obtain a trained generator model for generating generated raw depth map data items from the synthetic dense depth map data items.

The trained generator model is then applied in step S4 to generate training data from provided synthetic dense depth map data $D_{syn}$.

After training, the GAN model 10 allows to generate raw depth map data items $D_{raw\_syn}$ from synthetic RGBD data items (RGB image data items and dense depth map data items) which can be easily obtained. The raw depth map data can be in combination with the GB image data of the synthetic RGB image used to train a depth completion model or any kind of other data-driven model used for robotic or industrial applications.

FIGS. 4A to 4D show two exemplary sets of images showing a synthetic RGB image of an exemplary scene, a synthetic depth map of this scene, a generated raw depth map modeled with the generator model without preservation loss, and a generated raw depth map with consideration of preservation loss. It can be seen that the generator model 11 successfully adds peripheral and internal holes so that when considering the preservation loss, the resulting depth map data appears more realistic.

What is claimed is:

1. A computer-implemented method for providing training data for training of a data-driven model as a machine-learning model, wherein the data-driven model is to be trained to generate dense depth maps from sensor acquired raw depth maps, the method comprising the following steps:
   providing multiple synthetic dense depth map data items from CAD data of various synthetic scenes;
   providing multiple real raw depth map data items obtained from real-world depth sensor measurements of real-world scenes;
   training a generative model to obtain a trained generator model for generating generated raw depth map data items from the synthetic dense depth map data items; and
   applying the trained generator model to generate training data from provided synthetic dense depth map data.

2. The method according to claim 1, wherein synthetic image data items are obtained from the CAD data of the various synthetic scenes associated with the synthetic dense depth map data items, wherein the generator model is trained with a synthetic dense depth map data item depending on the associated synthetic image data item.

3. The method according to claim 1, wherein the generative model includes a GAN model with the generator model and a discriminator model.

4. The method according to claim 3, wherein synthetic image data items are obtained from the CAD data of the various synthetic scenes associated with the synthetic dense depth map data items; wherein the synthetic image data items are fed as input during training to the discriminator model which will be trained to distinguish between the generated raw depth map data items and the real raw depth map data items.

5. The method according to claim 4, wherein each synthetic image data item is fed to the discriminator without modification in conjunction with the generated raw depth map data item or is fed to the discriminator after a conversion to a grayscale image data item.

6. The method according to claim 3, wherein the training of the GAN model includes using a min-max optimization based on a discriminator loss further considering a marginal preservation loss, which is configured to penalize the generator model during training against modifying the dense depth map input unless the modification is larger than a given marginal threshold.

7. The method according to claim 6, wherein the marginal threshold is determined based on a difference between the synthetic dense depth map data item and the generated raw depth map data item.

8. The method according to claim 1, wherein the training data generated by using the trained generator model is used to train a data-driven model, the data-driven model being a depth completion model or an object detection model or an object segmentation model, which completes undetermined or unplausible pixel areas in erroneous raw depth map data items.

9. A device configured to provide training data for training of a data-driven depth completion model as a machine-learning model, wherein the depth completion model is to be trained to generate dense depth maps from sensor acquired raw depth maps, wherein the device is configured to:
   provide multiple synthetic dense depth map data items from CAD data of various synthetic scenes;
   provide multiple real raw depth map data items obtained from real-world depth sensor measurements of real-world scenes;
   train a generative model to obtaining a trained generator model for generating generated raw depth map data items from the synthetic dense depth map data items; and
   apply the trained generator model to generate training data from provided synthetic dense depth map data.

10. A non-transitory machine readable medium on which is stored a computer program for providing training data for training of a data-driven model as a machine-learning model, wherein the data-driven model is to be trained to generate dense depth maps from sensor acquired raw depth maps, the computer program, when executed by a computer, causing the computer to perform the following steps:
   providing multiple synthetic dense depth map data items from CAD data of various synthetic scenes;
   providing multiple real raw depth map data items obtained from real-world depth sensor measurements of real-world scenes;
   training a generative model to obtain a trained generator model for generating generated raw depth map data items from the synthetic dense depth map data items; and
   applying the trained generator model to generate training data from provided synthetic dense depth map data.

* * * * *